United States Patent [19]
Armstrong

[11] 3,805,481
[45] Apr. 23, 1974

[54] APPARATUS FOR AND PROCESS OF TREATING LIQUIDS WITH A GAS

[76] Inventor: Edward T. Armstrong, 490 Pepperidge Tree Ter., Butler, N.J. 07405

[22] Filed: Dec. 21, 1970

[21] Appl. No.: 100,192

Related U.S. Application Data

[63] Continuation-in-part of Ser. No. 813,382, Feb. 28, 1969, Pat. No. 3,549,528, which is a continuation-in-part of Ser. No. 362,118, April 23, 1964, abandoned.

[52] U.S. Cl............................ 55/93, 55/95, 210/63, 210/96, 210/220
[51] Int. Cl.............................................. B01d 21/24
[58] Field of Search......... 210/14, 60, 63, 209, 219, 210/220, 96; 55/93, 95

[56] References Cited
UNITED STATES PATENTS

| | | | |
|---|---|---|---|
| 2,330,672 | 9/1943 | Braak............................. | 210/209 X |
| 2,564,543 | 8/1951 | Moore............................ | 210/209 X |
| 2,660,559 | 11/1953 | Prime.............................. | 210/63 |
| 3,445,731 | 12/1970 | McManus....................... | 210/220 X |

FOREIGN PATENTS OR APPLICATIONS

| 1,377,571 | 9/1964 | France............................. 210/220 |
|---|---|---|

*Primary Examiner*—John Adee
*Attorney, Agent, or Firm*—Oldham & Oldham

[57] ABSTRACT

A gas-liquid mixing system for effecting selective bacterial reduction, generalized disinfection, sterilization or other gas treatment of the liquid. The system utilizes essential gravitational head and/or pumps in conjunction with a process flow line which may operate under a hydraulic pressure gradient which has an inlet at one end for receiving the untreated liquid and an outlet at its opposite end, one or more local areas of high momentum exchange, and one or more injectors for the introduction of a gas into the process line. The injectors are located so as to introduce the gas into the liquid downstream from the areas of high momentum exchange where the static pressure is at least partially regained. The gas may consist of air, oxygen, or an oxygen-ozone mixture, either alone or mixed with a carrier gas.

16 Claims, 9 Drawing Figures

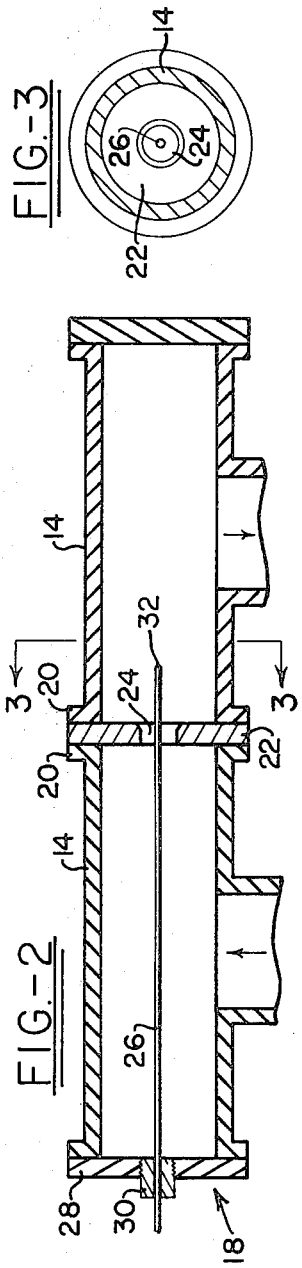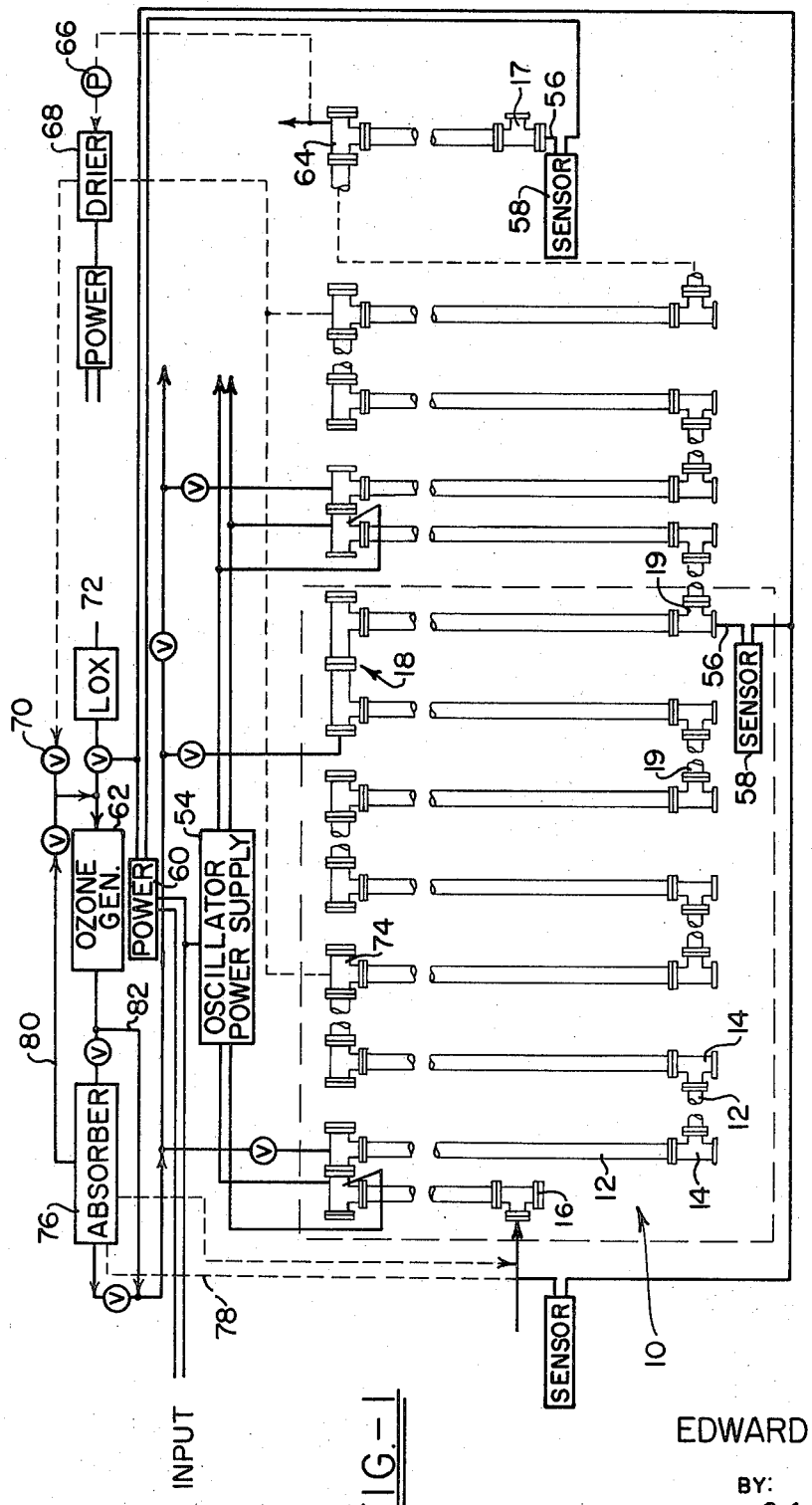

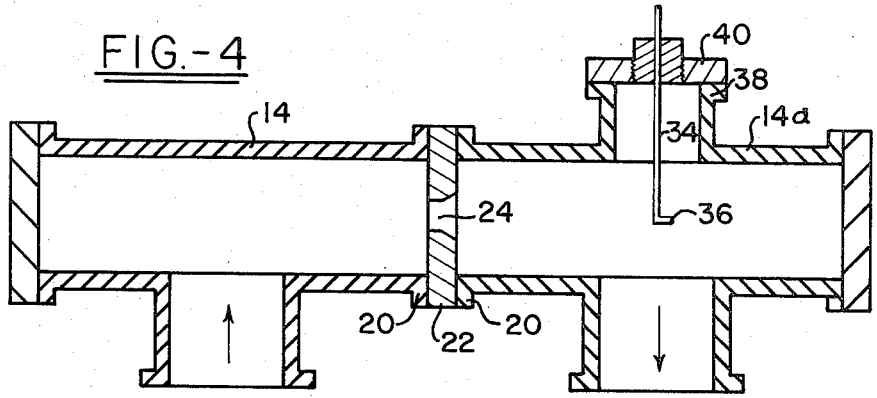
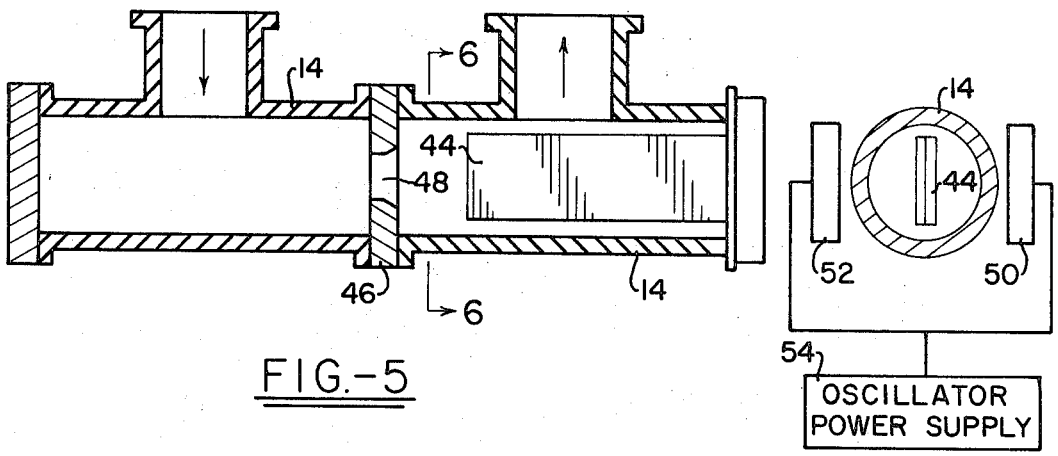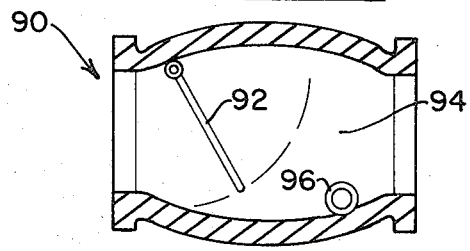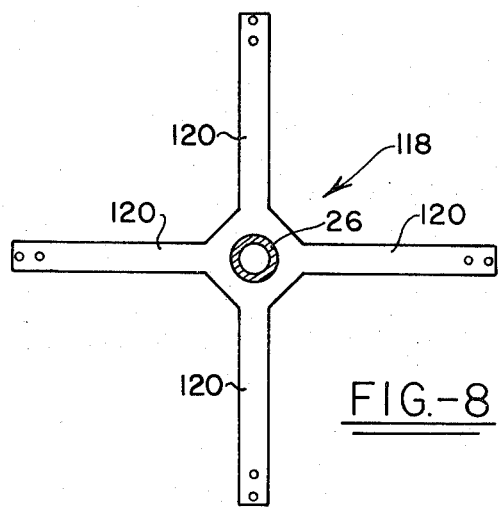

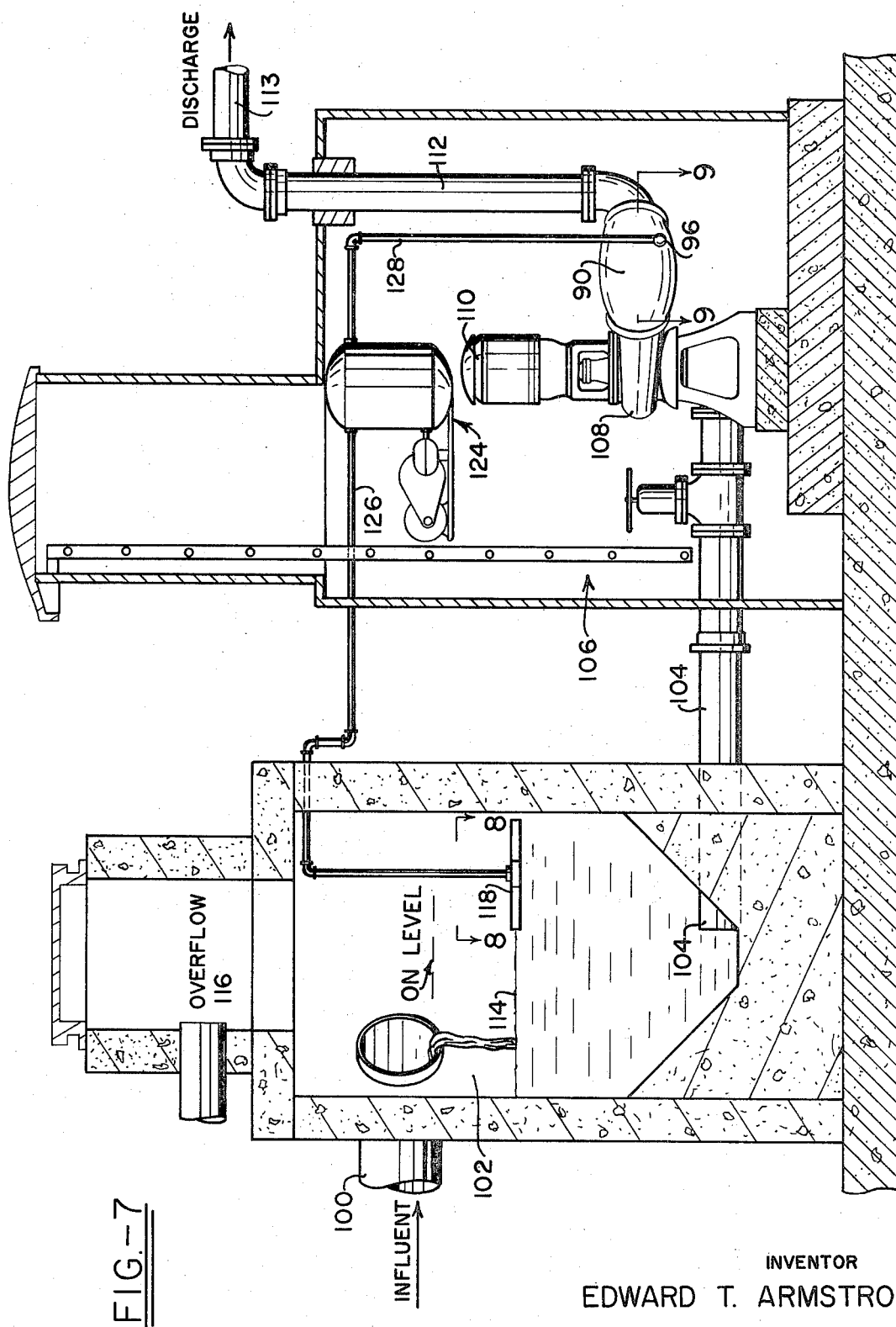

APPARATUS FOR AND PROCESS OF TREATING LIQUIDS WITH A GAS

This application is a continuation-in-part of my earlier application Ser. No. 813,382 filed Feb. 28, 1969, now Pat. No. 3,549,528 issued Dec. 22, 1970, which in turn is a continuation-in-part of application Ser. No. 362,118 filed Apr. 23, 1964 and now abandoned.

The present invention relates to a process and an apparatus for effecting the aerobic bacterial reduction of matter in a fluid and, more particularly, to the effecting of such bacterial reduction by the injection of an oxygen-containing gas into the fluid while the fluid is either under a gravitational or a hydraulic pressure gradient and under such conditions as to ensure uniform mixing of the gass with the waste fluid. Reduction as used in this specification refers to the aerobic bacterial action on the organic matter in the fluid and not to chemical reduction.

The reduction by aerobic bacterial action of inorganic or of organic matter entrained in a fluid is a well known phenomenon. It is well known that the rate of such reduction may be accelerated by the aeration of the liquid to increase the quantity of dissolved oxygen available for such bacterial reduction. However, the oxygen injecting techniques utilized heretofore have been highly inefficient, requiring the use of large quantities of oxygen-containing gas while achieving only a low dissolved oxygen concentration. This low efficiency of the prior art systems necessitiates the use of expensive, large sized installations. Also, the use of oxygen-containing gases other than air in such systems is costly due to the large quantity of gas necessary to achieve an effective dissolved oxygen concentration in the waste fluid.

A related problem encountered in the handling of liquid wastes containing organic materials is the initiation of septic or anaerobic bacterial decomposition of the organic materials with the resultant production of nauseous odors prior to and during plant treatment of the waste fluid. The problem is particularly acute in the handling of liquid sewage where the dissolved oxygen concentration of the fluid is rapidly reduced by the action of aerobic bacteria to a level which is insufficient to suppress the septic decomposition. This condition occurs both in the waste collecting system, for example, the force mains, and in the treatment facilities.

Further, the low efficiency level of the prior art oxygen injecting systems has rendered them unsuitable for use in maintaining sufficient dissolved oxygen levels in the waste collecting system to overcome the problem.

The present invention contemplates a novel system and process for effecting selective bacterial reduction of nutrient wastes in a liquid, generalized disinfection, or sterilization of the liquid. The apparatus and process are characterized by a marked increase in efficiency over the prior art systems and by a higher dissolved oxygen concentration in the treated fluid.

The rate and percentage of oxygen absorption by a fluid can be substantially enhanced if the injection of oxygen, an oxygen containing gas such as air, or an oxygen producing gas is accomplished in a fluid system maintained under a hydraulic pressure gradient substantially reduced from the gravitational pressure gradient. The absorption of oxygen by the fluid is further enhanced if the injection of the oxygen or oxygen containing gas is accomplished at a point of high momentum exchange in the fluid flow. Accordingly, the present invention contemplates the use of a flow process line which operates under a hydraulic pressure gradient which is substantially reduced from the gravitational pressure gradient and by the provision of high momentum exchange at the point of gas injection.

It has also been found that the ideal gas-liquid mixing conditions and, as a consequence, the maximum rate of absorption of injected gas into the liquid occurs with turbulent flow at or above a Reynolds number of 2,000, when the gas injection is accomplished at a rate proportional to the liquid flow rate to assure a uniform concentration in the axial direction in the flow line. The invention further contemplates that the gas injection is preferably coaxial with the liquid flow line so that variation in the gas liquid concentration is minimized in an angular direction. The combination of uniform rate of injection and coaxial injection with the subsequent provision of one or more regions of high momentum exchange after the point of injection serves to suppress any remaining radial variation in the injected gas concentration in liquid. This is an important feature as orifice mixers after injection suppress the radial concentration gradient.

It has been found advantageous in effecting selective disinfection to extend the interval of treatment with a pretreatment stage. The two stages are complementary and when jointly operated produce effective results beyond those which would be contemplated by consideration of the two stages separately. The two stage treatment process may be readily adapted to the treatment of waste fluids to defer the onset of septic decomposition. The present invention provides a process whereby the preliminary or pretreatment stage may be accomplished in the lines of the waste collection system. In typical waste collection systems, gravity lines discharge into wet wells from which the waste is pumped through force mains to intervening gravity means or to a treatment plant directly. By the use of the process of the present invention the selective disinfection of obligate anaerobic and microaerophilic microbiologic forms is effected. This can be accomplished first in the wet wells of the waste collection system and subsequently, to continue disinfection, aeration of the waste in the force mains can be initiated. It has been found that septic decomposition is deferred for hours after the dissolved oxygen injected into the fluid has been fully depleted by aerobic decomposition. This dual aeration technique resolves a long standing problem of odor in waste collection and treatment facilities.

It is accordingly the primary object of the invention to provide apparatus for and a process of injecting an oxygen-containing gas into a liquid in a process flow line. It is also an object of the invention to provide such apparatus and process in which the conditions of injection are maintained so as to assure the maximum dissolving of the gas in the liquid.

A further object of the invention is the provision of such apparatus and process in which means are provided to enhance the momentum exchange in the processed liquid effluent to further enhance the preferential solubility of the active gas in the liquid.

Another object of the invention is the provision of apparatus for effecting selective bacterial reduction in a liquid effluent which is characterized in that it operates, preferably in at least one stage, under a hydraulic pressure gradient substantially reduced from the gravitational pressure gradient so that diffusion of an oxygen-containing gas may be enhanced by the provision of high momentum exchange at the point of injection.

Another object of the invention is the provision of such apparatus and process in which the additional regions of high momentum exchange in the process flow line are introduced to suppress radial concentration gradients a sufficient interval after gas injection to assure complete and uniform exchanging of the gas in the liquid effluent. One or more such mixers may be introduced downstream from the injector-mixer combination to peel the sheath of gas fed in excess of that required for initial saturation from the conduit boundary and to remix it with the fluid.

A further object of the invention is the provision of apparatus and process for effecting selective bacterial reduction in a liquid effluent which is capable of being utilized in conjunction with existing waste collection systems to delay the onset of septic decomposition in the waste fluid thereby suppressing or substantially eliminating the odors in the waste collection and treatment systems while providing a pretreatment of the waste fluid in both a gravitational and a hydraulic gradient system and so enhancing the aerobic metabolism of nutruent material in the fluid during in-plant treatment. It should be understood that organic and inorganic load combined comprise nutrients. Inorganic load examples include sulfur, hydrogen sulfide, and nitrites, all of which are reducible aerobically.

For a more complete understanding of the invention and of the objects and advantages thereof reference should be had to the following detailed description and the accompanying drawing wherein there is shown a preferred embodiment of the invention.

In the drawing:

FIG. 1 is a schematic showing of the fluid treating apparatus of the present invention;

FIG. 2 is an enlarged, broken away cross-sectional view of the injector used in the system of FIG. 1;

FIG. 3 is a transverse sectional view taken along the line 3—3 of FIG. 2;

FIG. 4 is an enlarged broken away cross-sectional view of a modified injector;

FIG. 5 is an enlarged broken away cross-sectional view of the sting particle separator included in the system of FIG. 1;

FIG. 6 is a transverse sectional view taken along the line 6—6 of FIG. 5;

FIG. 7 is an elevational view, in section, of a wet well and pumping station of a typical waste collecting system and showing the application of the apparatus and process of the present invention to the pretreatment of liquid waste; and FIGS. 8 and 9 are fragmentary sectional views taken along the lines 8—8 and 9—9, respectively, of FIG. 7.

Referring first to FIG. 1, the reference numeral 10 designates generally the process flow line. This flow line may be formed of pipe links 12 which are connected together by suitable T's 14 or by other fittings such as elbows, gate, globe, or check valves, or the like. A T16 serves as the entrance of the process flow line and a T17 serves as the exit of the line. One or more of the pairs of T's 14 may be equipped to serve as injectors indicated generally by numeral 18, for the introduction of air, oxygen, or an oxygen-ozone mixture into the fluid stream to achieve and maintain the desired level of concentration of dissolved oxygen in the effluent to maintain the desired aerobic bacterial metabolism of the nutrient material which exerts a biological oxygen demand in aerobic processing of the effluent.

One form which the injectors 18 might take is illustrated in FIGS. 2 and 3. In this injector 18 a flat plate orifice 22 is held between the adjacent flanges 20 of the two T's 14. The orifice opening 24 is concentrically located within the T's and serves as a restriction in the fluid flow path to produce a point of high momentum exchange in the region downstream of the orifice. Projecting through the orifice 24 from the upstream side of the injector 18 is a small diameter pipe or tube 16 which extends through the cover plate 28 at the end of the T14 where it is secured by a suitable fitting 30. The end 32 of the injector tube 26 extends through the orifice 24 to or past the region of the vena contracta formed by the flow of the fluid through the orifice 24. The tube 26 is connected to the gas supply.

INJECTORS 18

The injector 18 is capable of achieving the conditions necessary for optimum mixing of the oxygen containing gas with the effluent. The rate of supply of gas through the tube 26 can be regulated in coordination with the effluent flow rate so that a uniform concentration of gas in the fluid is maintained in the axial direction. Since the tube 26 is coaxial with the fluid flow path there is no angular variation in the injected gas concentration. The vena contracta region in the fluid occurs at between 0 and 5 hydraulic diameters downstream of the orifice. Since the point of gas injection, the end 32 of the tube 26, is maintained within the region, gas injection is accomplished at a region of high momentum exchange and full mixing occurs, suppressing radial variation in the gas concentration. To ensure radial gradients in concentration are suppressed, the desired combination includes one or more additional orifices downstream of the combination to effect further radial mixing.

An alternate arrangement of an injector is shown in the FIG. 4. In this arrangement, a plate 22 having an orifice 24 is secured between the end flanges of a T14 and a cross fitting 14a. A small diameter pipe or tube 34 with its end 36 bent substantially at right angles to the pipe 34 extends downwardly through the upper leg 38 of the cross fitting 14a and is secured in fluid tight manner to an end plate 40 of the leg 38. Again, the tube 34 is connected to the gas supply and has its end 36 located within or downstream of the vena contracts region.

The highly efficient mixing which is achieved by the use of an injector 18 mixing orifice combination in conjunction with a downstream mixing orifice substantially reduces the quantity of gas which must be injected to achieve the desired dissolved gas concentration. Thus, with the use of the injectors 18 mixing orifice and downstream mixing orifice it is economically feasible to use any gas such as pure oxygen, an oxygen-ozone mixture, air, oxygen-enriched air, and other gases which may contain oxygen.

The invention contemplates however that other less efficient injecting mixing combinations may be used under some circumstances. One such combination is shown in FIG. 6. This injecting combination comprises a swinging gate type check valve 90 which has a gate 92 hinged for movement in the valve chamber 94. A tube 96 extends through the valve body into the valve chamber 94 on the downstream side of the check gate 92. The check gate 92 serves as a restriction in the fluid flow line and thus creates a region of high momentum exchange within the valve chamber 94. Although the gas inlet tube 96 does not discharge coaxially into the fluid stream, the region of high momentum exchange at the area of injection achieves a practically complete mixing of the injected gas with the liquid. The gate valve downstream serves as the additional mixing orifice needed to suppress radial concentration gradients. It accomplishes this owing to the annular ring present to engage the gate effecting a seal upon closure. This flow constricting ring serves as a mixer regardless of the degree of opening of the gate valve, as long as the valve is not closed.

It should be understood however that preferred conditions for gas-liquid injection are:

A. In steady state flow of the liquid
1. Steady state gas injection so that the concentration of gas in liquid in a unit length of line does not vary from one length to another. In effect, this suppresses the axial concentration gradient.

2. Ideally, gas injection should be coaxial, or via a concentric annulus in order to achieve gas concentration in the liquid in a unit length of line which does not vary in any angular section compared to any other angular section. In effect, this suppresses the angular concentration gradient.

3. Gas injection should occur at a restricted flow region in the line, preferably at a sharp edged orifice and under flow conditions termed turbulent, meaning the Reynolds' number if 3,000 or greater. The orifice imposes radial mixing and a change in velocity. The velocity profile in the fluid is changed at the restriction and undergoes a progressive transition thereafter. A new stable profile develops in about 20 to 40 diameters travel downstream. Preferably at such a point or further downstream, an additional mixing device may be introduced, ideally a sharp edged orifice. It induces appreciable mixing and momentum exchange. This occurs primarily in the radial direction. This mixing reduces variations in gas-liquid concentration in the radial direction.

In conjunction with preceding treatment to suppress the axial and angular concentration gradient, now the radial concentration gradient is suppressed. This achieves the physical and mathematical condition for complete mixing, i.e. the concentration gradient in every direction is nullified.

4. Subsequent to the first mixing device and at comparable separation downstream as described previously, a second sharp edged mixing element is introduced. This could be at subsequent joints for example, in FIG. 1, illustrated by numeral 19. It operates upon the stabilized velocity profile developed downstream of the first device. As before, it impresses a sudden transient on the velocity profile approximating slug flow, i.e. the velocity is constant in angle and radius at the flow restriction. After this transient, again the velocity profile proceeds through a transition and a stable profile develops. This is attended by thorough mixing, predominantly radial, whereby the radial concentration gradient of gas in liquid is reduced essentially to zero. Additional mixing may be introduced. However, tests show that this simple technique achieves gas-liquid mixing efficiencies in excess of 50 percent. Conventional mixing typically develops efficiencies less than 50 percent. Thus, an improvement is provided which is greater than an order of magnitude.

B. In unsteady flow, the foregoing conditions may be achieved by proportional flow control of the gas injection. An alternative is to regulate the unsteady liquid flow making it essentially steady flow. Care must be exercised to suppress liquid-gas flow interaction which may excite instability. This undesired result is more likely to occur at very high gas-to-liquid concentrations and it may lead to pulsating liquid flow. At high mixing efficiency it is unnecessary to operate in the unstable range of gas to-liquid concentrations. This is particularly so at the air-water system where at atmospheric pressure the air feed rate corresponding to saturation (of nitrogen) is about 20 ppm of air in water. At this rate the $O_2$ concentration is about 8 ppm, and the $N_2$ concentration is about 15 ppm. These concentrations pertain to saturation at one atmosphere. The concentrations by weight at saturation are proportional to the absolute pressure. For practical aeration in force mains exhibiting long residence times for waste, it suffices to aerate at feed rates of from five times the saturation rate to much lower rates, even less than the staturation rate. This corresponds to air-water concentrations of 100 ppm or less (by weight), at atmospheric pressure. The corresponding volume concentration is 10 percent at atmospheric pressure. Large clearance, low suction head pumps for waste pump stations cannot operate reliably anywhere near such volume concentrations. However, wet well aeration suffices at less than 1 ppm dissolved oxygen, but the injected air must be fed to the force main at high pressure. Injection at the pump suction is impractical. Injection in the pump volute is also undesirable. In either case, loss of prime threatens for practical injection rates. Injection at the downstream restriction of a check valve is practicable and is not prone to cause loss of prime. This is more fully defined with reference to FIG. 7 hereinafter. However, where dual pumps are installed, pump characteristics should be closely balanced practically and both check valves must be weight or spring loaded and operative. Thus, a practical compromise to the ideal conditions may be met using check valve restriction injection as an injecting-mixing combination, and mixing at restrictions downstream incident to the presence of gate valves, fittings and the radial mixing effects of long lengths of pipe.

In long force mains, during periods of low flow, waste residence times may be long. This depletes the initial dissolved oxygen concentration as a consequence of aerobic bacterial metabolism. The excess air injected beyond that required to achieve saturation then comes into play.

This air is carried through the force main. At usual pumping rates in typical mains, the excess air traverses the line in frothy slugs or in an annular sheath at the pipe wall. While this is a stable location, the air sheath may not be absolutely uniform in thickness from time to time and in an angular direction around the pipe cross-section.

Thus, at locations in force mains removed from the point of initial air injection and mixing, say a distance of at least 200 hydraulic radii of the force main, or up to a distance of several thousand hydraulic diameters, a concentration gradient predominantly radial, and concurrent control oxygen depletion may develop. To utilize oxygen in this air sheath or slug, it suffices to provide a mixing orifice at the locations noted. This remixes the air and restores the depleted dissolved oxygen. Aerobic metabolism is sustained.

The amount of excess air injected should be enough to provide approximately 1 to 2 ppm of $O_2$ per hour. In a long residence time line, of say for example 20 to 40 hours, the amount of air injected could be as much as 10 times the saturation amount to attain the $O_2$ ppm requirements for the particular pressure of the force main and the expected residence time. Hence the main point is to provide the proper amount of $O_2$ dependent on the objective of the system.

One other operational advantage of the excess air or $O_2$ injection is that the pressure loss in the line or force main is reduced with air in the line so the pumping means will operate at lower pressure than in an unaerated hydraulic system.

An orifice may not be introduced conveniently in existing lines. However, standard fittings may serve the same purpose, or an orifice may be introduced in an existing fitting. Combinations such as reducers (diffusers), valves, Ys or even the free jet discharge to a gravity main or head box can effectively utilize excess air provided beyond that required to achieve initial saturation.

STINGS TO BREAK UP SOLIDS

Certain of the T's 14 of the process flow line 10 may also be provided with stings 44 to provide hydraulically transmitted or direct mechanical disruptive forces on flocs, plaques, or agglomerates which may be present in the liquid effluent. Such a sting is illustrated in FIGS. 5 and 6. The sting 44 is comprised of a thin elongated blade, preferably of ferritic stainless steel and is actuated by the oscillations of electromagnets 50 and 52 positioned on opposite sides of the T as shown in FIG. 6. The electromagnets 50 and 52 are driven by a suitable oscillator power supply 54. As is shown in FIG. 5, the sting 44 may be located immediately following a flat plate 46 having an orifice 48 so that the sting operates in a vena contracta region. Preferably, the stings 44 are positioned upstream of the gas injectors 18 so that particulate size reduction is enhanced.

The stings 44 may also be used to effect a degasing of the liquid effluent. This may be necessary where the fluid becomes saturated with non-active gases, preventing the further absoprtion of oxygen.

The gas injected into the flow process line may consist of air, oxygen, a gaseous mixture of oxygen and ozone, or other oxygen and/or ozone mixtures with suitable carrier gases. It should be noted, however, where ozone is to be generated, oxygen as a feed gas is superior to air. In this case a number of significant improvements naturally follow. It is a known physical fact that the potential solubility of oxygen in water is five to six times as great if introduced in equilibrium from oxygen as is possible when oxygenation is practiced in equilibrium from air. Similarly, the solubility of ozone in water introduced in equilibrium from oxygen enables a higher concentration of ozone to be injected while less oxygen carrier is required. The absence of nitrogen makes this possible.

When a gaseous mixture of ozone and oxygen is employed, injection occurs at or less than approximately 5 percent concentration of ozone in oxygen, by weight. For disinfection or sterilization the ozone is introduced in amounts greater than 0.5 milligrams of ozone per liter of liquid. For selective bacterial reduction, as of obligate anaerobes and of microaerophilic forms, the oxygen-containing feed gas may exhibit a very low concentration of ozone, such as the concentration normally present in air. The injected concentration of oxygen and of ozone will attenuate in the flow line. Two factors cause this attenuation. One if the decomposition rate of ozone in water resulting in oxygen formation. The second factor is the oxidation load of the nutrient material contained in the processed fluid. In the typical waste this is comprised primarily of materials of organic origin which are bacterial nutrients either incompletely oxidized in solution or present as particulates. These materials in part comprise the load of waste which causes a very rapid reduction in any ozone present and a slower reduction in the amount of dissolved oxygen present in any point downstream of the ozone and oxygen injection.

Hence it should be seen that the process control can be accomplished by dissolved oxygen measurement to regulate the dissolved oxygen at or controllably below the saturation level, for example, at a concentration in equilibrium with that in the region above the liquid surface. Similarly, the dissolved oxygen concentration at discharge may be regulated such that the mixing of the discharge in the receiving media will ensure proper dissolved oxygen concentration in the mixture and will ensure that the ozone concentrations evolved into the air within a confined space does not exceed a suitable limit, such as 0.01 to 0.05 ppm. Permissible limits for ozone concentrations in air are higher for transitory exposure in comparison with those considered acceptable for prolonged ozone exposure of humans.

From the above, the purpose of sequential injection is clear. The number of points or the distance or time in the flow line 10 will depend upon the impressed oxidation load and particulate size present in the load. It is anticipated that in normally operating systems for general disinfection or sterilization, the time for processing will not exceed 8 minutes. In contrast, for selective bacterial reduction practical circumstances may dictate the need for extended times of exposure and the necessity for use of the gravitational gradient in one step of a two-stage process, as will be described below.

It should be understood that the piping system indicated in FIG. 1 may be rotated to any position. Changes in elevation do not have much effect on the functional result even where in the entrance 16 and discharge 18 may be at different heights, so that in essence a superimposed gravitational gradient is present when considering the system as a whole.

The invention also contemplates that excess oxygen may be picked off the process flow line 10 at a point 64 by a suitable pump 66 and sent into a treatment or waste line or to a dryer 68 for transfer therefrom through a control valve 70 into the supply line from the oxygen supply source 72 to the ozone generator 62. A suitable power supply activates the dryer 68. Also, excess desorbed oxygen can be picked off earlier at point 74 and fed into the dryer 68. The sting 44 may be employed to cause such oxygen desorption.

The disposition of gas removed from the collection points, such as point 64, must be considered carefully. For example, in an air injection system, the undissolved gas will be relatively rich in nitrogen. This follows the fact that oxygen solubility in aqueous systems is higher than is nitrogen solubility. Therefore, such undissolved gas might well be exhausted to waste. In contrast is the case where dissolved equilibrium mixtures come out of solution. This may occur by pressure reduction, by heating or by intense sonic or ultra-sonic excitation. Such liberated gases, in the case of air feed, will exhibit the concentration shift toward a higher oxygen concentration than that present in the original air feed. In this event, the recovered gas may be more useful than the straight air feed. This would be the situation where drying and ozonation is planned. For bacterial reduction selectively focused on obligate anaerobes, excess air fed or the gas once dissolved and subsequently expressed from the solution is as useful as the original air feed. Thus reinjection or remixing of this gas is desirable. This may be accomplished in force mains conveniently as previously described.

An absorber indicated by the block 76 may be included to receive the output from the generator 63 before passing the ozone concentrated fluid into a supply line 78 so as to remove all excess oxygen with the excess oxygen being fed back over line 80 to the supply to the generator 62.

In some instances it may also be desirable to have the liquid effluent entering at the point 16 into the process flow line 10 pass through some kind of an absorber to degas or desorb oxygen out of the effluent so that the oxygen-ozone mixture may be injected into the fluid. This may be necessary since a fluid presaturated with oxygen will not readily adsorb the injected oxygen and ozone mixture.

TWO STAGE SYSTEM

Under certain circumstances a two stage process in which one stage operates at a gravitational gradient while the other stage operates at a hydraulic pressure gradient may be desirable and achieve improved results. Such a two stage treatment system is advantageous in waste collection systems in deferring the onset of septic decomposition. One embodiment of such a system is shown in FIGS. 7 through 9, where the two stage process is adapted to a substantially conventional wet well and lift station of a waste collection system.

Referring now to FIG. 7, this embodiment of the invention will now be described in detail. A waste collection or sewage line 100 discharges its effluent into a wet well 102, which may be of conventional construction, and which has an outlet 104 at its lower end. The outlet 104 is connected to the pumping station 106. The pumping station 106 includes a pump 108 driven by a motor 110 and receives the effluent through a valve and a suction pipe 104 from the wet well. From the pump 108 the effluent is forced through a gate type check valve 90 and a vertical pipe 112 to a line and ultimately to a discharge pipe 113 at a level higher than the level of the wet well input 100. It will be seen that the liquid in the wet well 102 is under a gravitational pressure gradient while the liquid in the piping system downstream of the pump 108, that is, the check valve 90, vertical pipe 112, and the discharge 113, is under a hydraulic pressure gradient during pumping with a superimposed gravitational gradient.

As was pointed out above, the septic decomposition of the microbiological nutrient material in the effluent results in the production of nauseous odors. This odor formation can be suppressed by the injection of air or other oxygen containing gases into the effluent to suppress the septic decomposition. Such pretreatment in the wet well is desirable. In the present embodiment, this injection is accomplished by the provision of a spider injector 118 in the wet well which is supplied with air by a compressor 124 through a suitable conduit 126.

The spider injector 118, shown in FIG. 8, may consist of four tube lengths 120 joined in the form of a cross with the outer ends of each of the tubes 120 being closed and with holes 122 being provided near the outer end of each tube. The spider 118 may achieve very low oxygen concentrations or a nearly complete saturation of the effluent at the liquid pressure corresponding to its operating level. Fluid circulation paths are formed above the spider resulting from the aeration. This results in a corresponding induced flow below the spider in a cylindrical wet well, and in effect a toroidal vortex circulation is developed. This circulation occurs about a central vertical axis. Small tangential components of flow in the vortex are induced by the gravitational and rotational action of the earth. As a result of these combined circulations, a uniform mixing of the injected air in the effluent is achieved.

The vertical location of the spider 118 also is critical so that the centrifugal pump 108 remains properly primed and loss of prime does not occur. In other words it is desirable that the normal effluent level in the usual wet well configuration be raised so that there is a minimum of 6 feet of effluent at the pump off level above the suction line 104, in the embodiment illustrated. These relationships may change for other installations, but suffice it to say that the air injected into the effluent in the wet well must be injected near the upper level of the fluid and at conservative flow rates so that the centrifugal pump does not lose its prime.

It should be noted that the pump serving the wet well is level actuated. Thus, at some fluid height pumping begins. The static pressure at the pump impeller eye then drops immediately below the head necessary to initiate pumping and decreases progressively during pump down to the pump-off pressure. The preferred effluent levels for pump-on and pump-off are indicated in FIG. 7. As stated above, it is essential to position the spider injector 118 at a level in the well 102 which is higher than the level corresponding to the pressure at the pump impeller eye during pump operation. Moreover, this positioning is critical in that aeration in excess of that at minimal rates to achieve the desired residual dissolved oxygen concentration to effect selective disinfection of obligate anaerobic forms may interrupt pumping operation. This may occur by loss of prime within the pump unless the spider is located above the critical liquid level so that too much dissolved air is not introduced within the effluent and progressively desorbed at the pump impeller eye.

If the spider level is below the critical point, the dissolved air approaches saturation at excessive pressure. Then degasing will occur at the pump impeller eye to reduce the gas saturation to a level sufficient to saturate the fluid at the existing pressure at this point. There is thus a progressive accumulation in the impeller eye of excess air. In the intervening intervals when the pump 108 is not operating, the oxygen in this air pocket is depleted by aerobic metabolism. However, the nitrogen of the air is unaffected. Thus, over a period of time excessive air is degased from the liquid and mixes with the nitrogen rich residue. Ultimately, the air pocket causes loss of prime on the pump. This has been found to occur repeatedly, requiring air bleeding and restarting of the pump.

If, however, the aeration spider 118 is positioned above the critical level in the wet well the period of reliable operation of the pump is extended indefinitely. The preferred level of the spider, as defined above, is near the pump-off level 114. Levels higher than this are also feasible because the increased level extends waste residence time in the wet well. The prior art teaches that minimum residence time is desirable. In contrast, extended time is preferred as this facilitates selective disinfection and a large reservoir of aerated waste remains when the pump-off level is reached. The dissolved oxygen content in this reservoir will carry the residual and incoming fresh waste aerobically until the waste level increases sufficiently to reimmerse the actuating spider. Then, the spider will resume effective aeration.

Such a spider location has a further benefit. It allows reduced aeration efficiency as the suction head on the pump falls commensurate with the pump impeller eye pressure which is also falling.

In waste collection systems, the residence time for the waste held in the forced mains may be as long as 4 to 6 hours. In large collecting systems, such as those serving several municipalities and in ocean out fall lines the waste residence time may be of several days length. The invention contemplates that aerobic conditions will be sustained in the force main regardless of the total length of time of the effluent therein but that provision of suitable conditions for a prolonged time of at least an hour is desirable. In such collection systems the use of injecting techniques at the wet wells of the system are particularly advantageous in deferring septic decomposition and odor production in the waste. The injection of oxygen into the waste also serves to sustain the treatability of the waste.

The embodiment illustrated in FIG. 7 also contemplates the injection of air into the waste fluid when such fluid is under the hydraulic pressure gradient, that is, the fluid on the downstream side of the pump 108. This injection may be accomplished by means of an injector 126 located in the check valve 90 and connected through a suitable conduit 128 to the air compressor 124. As was described above, the provision of the injector 196 in the check valve 90 serves as an efficient injecting combination since the fluid passing through the check valve 90 is an area of high momentum exchange, to assure uniform mixing of the injected air in the effluent. Mixing upon injection is subsequently complemented by the additional mixing enabled by the gate valve and its annular sealing ring. Obviously, a much higher rate or amount of air injection can be used at the injector 96 in the check valve 90 than can normally be employed with the spider 118 in the wet well 102. This permits the dissolved oxygen level, the reserve in supersaturated air, in the effluent on the downstream side of the pump 108 to be maintained at a sufficiently high level to restrain the septic decomposition for a substantial period of time.

Practical considerations may further dictate necessary compromises in the use of non-ideal mixing and/or injecting means. Typical compromise expedients include injection at constrictions following check valves and mixing at line restrictions such as open or partially closed gate valves, fittings, and the like.

As a further extension of the invention it is contemplated to run the effluent under the hydraulic gradient into the lower levels of liquid under a second gravitational gradient such as an activated sludge tank, or another wet well. Normally the gas, or air containing liquid would be circulated in all three stages at rates to maintain the desired $O_2$ level. Hence the flow sequence for the effluent would be through a gravitational gradient, a hydraulic gradient, and another gravitational gradient.

The invention further contemplates that the gas injected effluent under the hydraulic gradient secondly described would discharge to fall through an extended surface media, such as a trickling filter. Hence, the sequence for the effluent would be a gravitational gradient, a hydraulic gradient, and run out over an extended surface media, in conditions of restricted free fall.

It should be further understood that the hydraulic pressure gradient under which at least one stage of the system is operated may be one half or even less than this fraction of the gravitational gradient. Thus the hydraulic pressure gradient contemplated by the invention is one which might be from one-half the gravitational gradient to any smaller fraction thereof. A gravitational gradient is defined as plus/minus 1 foot of fluid per foot of path length. Normally, the invention contemplates holding the liquid in the gravitational and/or the hydraulic gradient for a time or corresponding distance throughout which the desired aerobic metabolic conditions are to be sustained. The conditions will persist after discharge even under a gravitational gradient or the restricted free fall condition described above.

In one stage of the selective bacterial control, the invention specifically calls for the turbulent flow of the liquid. This indicates that the Reynolds number for the flow is greater than 2,000 and preferably 3,000 or greater. This level precludes flow reversion to laminar conditions which restricts turbulence and would inhibit the desired mixing of the injected gas. The Reynolds number is defined by the product of the characteristic diameter of the conduit multiplied by the average velocity of flow and divided by the kinematic viscosity of the fluid.

For any fluid, the kinematic viscosity is known or is measurable, since it is the ratio of the absolute viscosity to the density. Therefore, the Reynolds number quantitatively relates the critical minimum velocity and the characteristic diameter of the channel as a product to the quantitative magnitude of the kinematic viscosity. This yields values relating velocity for any diameter. Such values of velocity are quantitatively definitive of time. For example, velocity may be considered to be the ratio of distance traversed in the conduit divided by the time required.

Hence, it should be understood that the minimum velocity to create a Reynolds number of 3,000 or greater can be established for any diameter pipe size. Assuming a one inch diameter, for example, the water velocity must be equal to 0.36 feet per second. If it is determined for a 1 inch diameter pipe that 10 minutes are required to achieve the degree of disinfection desired, the conduit length will be 216 feet. This may be in the form of a straight conduit. However, it is equally convenient to consider a folded bundle similar to that shown in FIG. 1 which conserves space. In order to achieve these conditions, the bundle may consist of 19 elements and have a height of 11.4 feet. Each element will consist of 1 inch inner diameter pipe 12 feet in length. In this configuration, as many as five flat plate orifices might be used with a sweep elbow associated with each element. Thus, a computation of the pressure drop in the pipes, orifices, and elbows would equal 1.5 times $10^{-3}$ feet of fluid per foot of line. The size of the envelope of this bundle would be about 12 feet high by about 2 feet in diameter.

The hydraulic gradient in this case is about one-fifteen hundredth as great as the gravitational pressure gradient. If the inlet and outlet of the bundle were at the same elevation as is shown, for example, in the configuration of FIG. 1, no effect of height occurs. Even if there is a height differential, it would be immaterial to the process because the hydraulic pressure gradient is maintained over the entire length of the pipes.

While in accordance with the patent statutes only the best known embodiments of the invention have been illustrated and described in detail, it will be particularly understood that various modifications can be made in and to the invention without departing from the spirit thereof. Reference should therefore be had to the appended claims in determining the true scope of the invention.

What is claimed is:

1. Apparatus for effecting bacterial reduction of organic matter in a liquid effluent, comprising:
   a piping system forming a flow line for liquid under a hydraulic pressure gradient and having effluent receiving points and discharge points separated therefrom;
   a plurality of restrictive means in the flow line providing a region of relatively intense momentum exchange in the liquid flow;
   adjacent said restrictive means being separated at least five hydraulic diameters of the flow line;
   a source of oxygen-containing gas;
   at least one injector means in the flow line for injecting the oxygen-containing gas into the effluent at the region of relatively intense momentum exchange to achieve optimum mixing while suppressing axial and angular concentration gradients; and
   at least one said restrictive means located downstream from the one at which gas is injected.

2. Apparatus according to claim 1 further including additional means in the flow line providing mechanical disruptive forces to the matter entrained in the effluent wherein the additional means comprises an elongated blade of a magnetically attractive material and magnetic means to effect oscillatory vibration to said blade.

3. Apparatus according to claim 1 further including sensing means for detecting the dissolved oxygen concentration in the effluent at at least one point intermediate the ends of the flow line, and control means regulating the quantity of oxygen-containing gas injected into the effluent in response to the sensing means to maintain a predetermined dissolved oxygen level in the effluent in at least a portion of the flow line.

4. Apparatus according to claim 1 further including collecting means for removing unabsorbed gases from the flow line at at least one point intermediate the ends thereof wherein the collecting means returns the desorbed oxygen to the oxygen-containing gas source.

5. Apparatus according to claim 3 wherein the collecting means returns the desorbed gas to the processing line at a point subsequent to the point of collection, and includes means to directly remix the excess gas into the liquid.

6. A method for effecting gas solution in a liquid effluent, comprising the steps of flowing a liquid effluent through a confined path under a hydraulic pressure gradient substantially reduced from the gravitational pressure gradient, and restricting the flow of the liquid in the confined path at at least one point to provide at least one region of intense momentum exchange and turbulence in the effluent, and introducing a gas into the region of intense momentum exchange wherein the restriction is accomplished by flat plate orifices positioned in the flow path, and the introduction of the gas being injected near the vena contracta region immediately following one of the restrictions, the other restrictions being positioned downstream of the injection point and where such injection is made under the conditions of approximately constant fluid flow and steady state gas injection, and coaxial gas injection to the flow path of the liquid so that axial and angular gas concentration gradients throughout the liquid approach zero.

7. A method according to claim 6 further including an additional fluid container operating under a gravitational pressure gradient, the additional fluid container discharging effluent to the input of the confined path operating under a hydraulic gradient and means for injecting gas into the effluent in the fluid container.

8. A method according to claim 7 which includes providing the additional fluid container with a free standing wet well, and injecting the gas near the surface of the wet well at a plurality of spaced intervals adjacent the surface thereof to create a flow path of the effluent in the wet well from top to bottom in a vortex configuration.

9. A method according to claim 7 which includes providing a second additional fluid container under a gravitational gradient and circulating the effluent to the second additional fluid container.

10. A method according to claim 7 which includes the step of passing the effluent from the end of the confined path through an extended surface media.

11. Apparatus for suppressing odors and effecting bacterial reduction in a waste collection system comprising a wet well under a gravitational gradient, a force main off the wet well under a hydraulic pressure gradient comprising a pump means taking suction on the wet well and discharging into the force main, injectors located in the wet well of the system for injecting an oxygen containing gas into the effluent in the wet well, and additional injectors located in the force main for injecting an oxygen containing gas under intense mixing conditions into the effluent in the force main.

12. Apparatus according to claim 11 which includes means to provide high momentum exchange in the effluent at at least one point in the force main and wherein at least one of the additional injectors is located at the region of relatively high momentum exchange in the force main.

13. Apparatus according to claim 12 which includes at least one additional means to provide high momentum exchange in the effluent at a distance of at least 40 hydraulic diameters of the force main downstream of the said one additional injector, and at least one further additional mixing means to provide high momentum exchange in the effluent at a remote distance downstream of said one additional injector where concentration gradients and/or oxygen depletion in the effluent have developed to remix excess gas in the fluid.

14. Apparatus according to claim 13 wherein check valves are provided in the force mains, the injectors being located at the check valves, and the pump means forces the effluent through the force main at a Reynolds number greater than 3,000.

15. Apparatus according to claim 14 wherein the pump means is a centrifugal pump and the first mentioned injectors each comprise a plurality of horizontally extending pipe lengths each joined at one end to a common supply line and having a plurality of small diameter holes at the opposite end, and such injector is located near the top of the effluent level in the wet well and means to maintain a level of effluent in the wet well so that the location of the first mentioned injectors is related to the head pressure at the centrifugal pump so that the pump will maintain prime.

16. Apparatus according to claim 15 where the length and size of the force main is such that the residence time of the effluent in the force main is sufficient to provide prolonged aerobic conditions in the system of at least 1 hour.

* * * * *